(No Model.) 2 Sheets—Sheet 1.

E. B. WEBBER.
MUZZLE.

No. 459,557. Patented Sept. 15, 1891.

Witnesses;
J. M. Withrow.
H. J. Riley.

Inventor
Edward B. Webber,
By his Attorneys.
C. A. Snow & Co.

(No Model.) 2 Sheets—Sheet 2.

E. B. WEBBER.
MUZZLE.

No. 459,557. Patented Sept. 15, 1891.

Witnesses:
J. M. Withney
H. F. Riley

Inventor
Edward B. Webber,
By his Attorneys,
C. A. Snow & Co.

UNITED STATES PATENT OFFICE.

EDWARD B. WEBBER, OF COLLIERVILLE, TENNESSEE.

MUZZLE.

SPECIFICATION forming part of Letters Patent No. 459,557, dated September 15, 1891.

Application filed March 14, 1891. Serial No. 385,078. (No model.)

*To all whom it may concern:*

Be it known that I, EDWARD B. WEBBER, a citizen of the United States, residing at Collierville, in the county of Shelby and State of Tennessee, have invented a new and useful Improvement in Muzzles, of which the following is a specification.

The invention relates to improvements in stock-muzzles.

The object of the present invention is to simplify and improve the construction of stock-muzzles and provide a device adapted to be readily attached to an animal and capable of permitting the same to graze freely when its head is in a lowered position and of covering the mouth when the head is in an elevated position to prevent biting, eating fruit-trees and growing grain, and to serve as a calf-weaner.

The invention consists in the construction and novel combination and arrangement of parts hereinafter fully described, illustrated in the accompanying drawings, and pointed out in the claim hereto appended.

Figure 1:
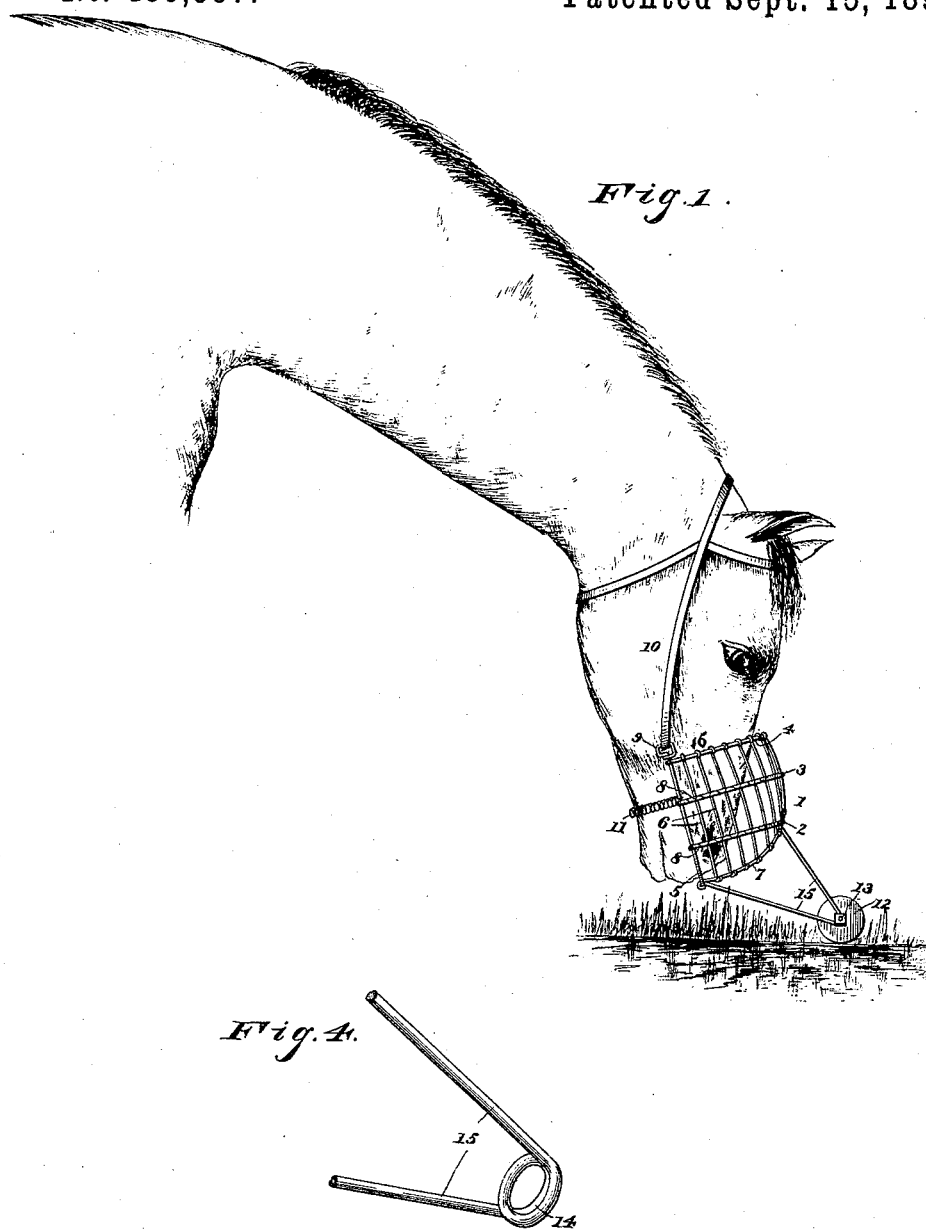
Figure 2:
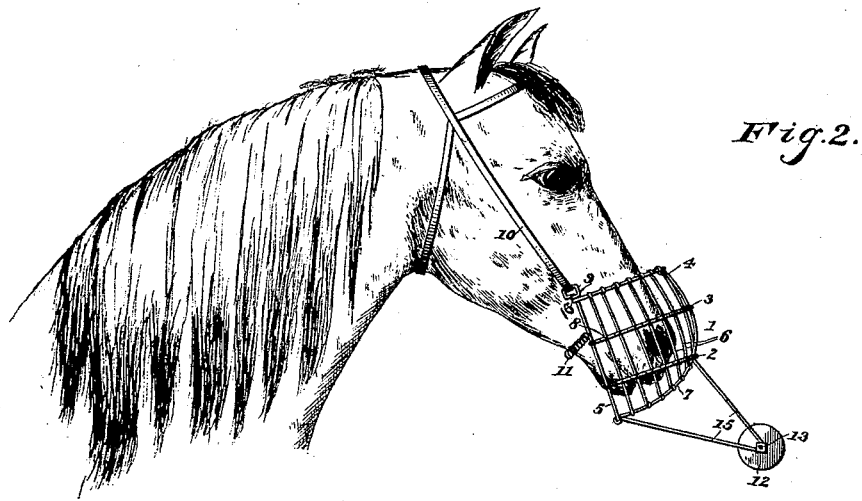
Figure 3:
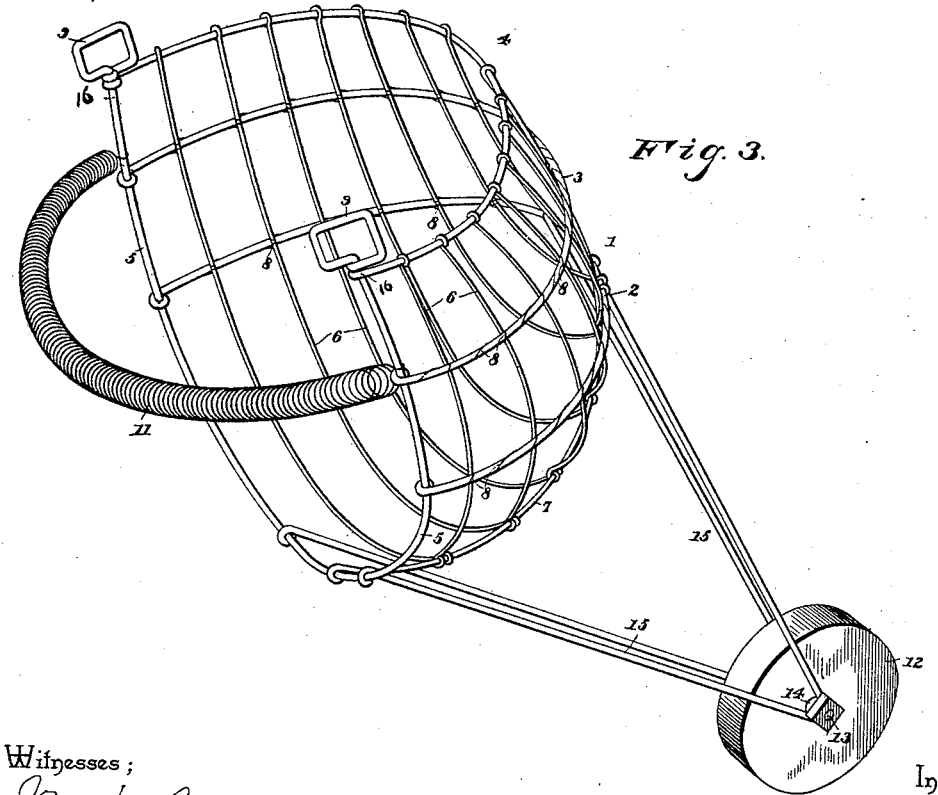

In the drawings, Figure 1 is a side view of a muzzle constructed in accordance with this invention and shown applied to an animal, the latter having its head lowered for grazing. Fig. 2 is a similar view showing the position of the muzzle when the head is elevated. Fig. 3 is a perspective view of the muzzle detached. Fig. 4 is a detail view of the outer portion or apex of one of the arms.

Referring to the accompanying drawings, 1 designates a muzzle approximately quadrant-shaped in section, constructed of stout wire and adapted to fit over the nose and mouth of an animal and cover the same when the head of the animal is in an elevated position and to move forward when the head is in a lowered position to permit the animal to graze. The muzzle consists of the curved bows 2, 3, and 4, the base-wire 5, all of which are constructed of heavy stout wire, and a series of mesh-work wires 6, which have their outer ends provided with eyes and arranged on the end bow 4, and their inner ends are provided with similar eyes which are arranged on a central or ridge wire 7 and the bow 2. The wires 6 are connected to the bows 2 and 3 by fine wires 8. The ends of the base-wire 5 are provided with loops 9, to which is secured the headstall 10 of a halter, and secured at opposite points of the base-wire 5, about midway the length of the muzzle, is a spiral spring 11, which passes around the chin of an animal and serves as an elastic chin-band adapted to retain the muzzle in proper position when the head of the animal is elevated and to allow the muzzle to depress forward when the head is lowered and the animal desires to graze, and to draw the muzzle quickly to its proper position as soon as the muzzle leaves the ground. The muzzle is quadrant-shaped in section and is pivotally connected at its corners or angles 16 to the headstall 10 and has a pivotal swing to free the mouth of the animal. By this arrangement the animal is prevented biting or eating when its head is above the ground, thereby enabling animals to graze in orchards and cultivated fields without liability of having the fruit eaten or the plants disturbed.

The muzzle is provided with a small wheel 12, which enables the muzzle to pass freely over rough ground and which takes the weight of the muzzle from the animal, and which is mounted on a bolt 13, which is secured in eyes 14 of V-shaped arms 15. The V-shaped arms 15 are constructed of wire and each is provided at its apex with double coils to form eyes 14, and they have their ends provided with eyes and secured to the base-wire and the bow 2.

From the foregoing description and the accompanying drawings the construction, operation, and advantages of the invention will readily be understood.

What I claim is—

The combination, with the headstall of a bridle, of the muzzle quadrant-shaped in section and adapted to fit over the nose and mouth of an animal and pivoted at its angles or corners 15 to the headstall and having a pivotal swing to free the mouth of the animal, the spiral spring chin-band having its ends secured to opposite sides of the muzzle and arranged to pass around the chin to return the muzzle when the head of the animal is raised, the arms secured to the muzzle, and a wheel pivoted to the arms, substantially as described.

In testimony that I claim the foregoing as my own I have hereto affixed my signature in presence of two witnesses.

EDWARD B. WEBBER.

Witnesses:
JNO. H. MEBANE,
A. J. CAMPBELL.